Patented Feb. 5, 1929.

1,701,144

UNITED STATES PATENT OFFICE.

HANS T. CLARKE AND ERNEST R. TAYLOR, OF ROCHESTER, NEW YORK, ASSIGNORS TO EASTMAN KODAK COMPANY, OF ROCHESTER, NEW YORK, A CORPORATION OF NEW YORK.

METHOD OF MAKING 2:4-DIMETHYL-6-ETHOXYQUINOLINE.

No Drawing. Application filed July 7, 1923. Serial No. 650,427.

This invention relates to an improved method for the production of 2:4-dimethyl-6-ethoxyquinoline.

This material is the principal ingredient in the manufacture of the sensitizing dye known as dicyanin, and hitherto has been produced only by a troublesome process, involving the action of a mixture of acetone and acetaldehyde or its equivalent upon p-phenetidine in the presence of hydrochloric acid. The yield attained is poor and the isolation of the product is extremely tedious.

We have found that the same product can be made in a two step process, each of the steps being simple, and a comparatively high yield obtained.

The first step comprises the interaction of p-phenetidine with acetone in the presence of a suitable catalyst, such as iodine, yielding a compound, presumably p-ethoxyacetoneanil, which can be readily isolated by fractional distillation.

The second step comprises the conversion of this compound into the desired product by heating in a current of hydrogen chloride. The quinoline derivative may readily be isolated by fractional distillation and purified by recrystallization.

We will now proceed to give detailed instructions for carrying out the complete process.

The following ingredients are mixed:

|  | Grams. |
|---|---|
| p-phenetidine | 3675 |
| Acetone | 740 |
| Iodine | 25 |

These are boiled under a reflux condenser for 36 hours, the temperature of the reaction mixture being between 92° and 96° C.

Acetone and water are distilled off until the temperature of the reaction mixture reaches 140° C.

To the reaction mixture is now added 370 grams of acetone and this is boiled under a reflux condenser for 36 hours, the temperature being about 104°.

After distilling off, as before, acetone and water, 370 grams of acetone are again added to the reaction mixture which is boiled under a reflux condenser for 36 hours, the temperature being about 107°.

After further distilling off acetone and water, as before, until the temperature of the reaction mixture reaches 140° C., the mixture, after cooling, is washed with dilute sodium hydroxide.

It is then submitted to fractional distillation under reduced pressure, in practice at about 10 mm. pressure when a phenetidid compound, presumably p-ethoxyacetoneanil, is distilled over at a temperature of from 165° to 180°.

The reaction involved in the above step is believed to be as follows:

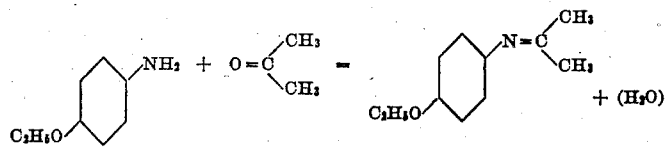

This ends the first step of the process. The yield varies somewhat. With the process carried out as above described it lies between 700 and 950 grams of the compound, and runs usually well over 800 grams.

The fractional distillation may take place after the first or second distilling off of acetone and water. If it is done after the first distilling the yield is about 60% of that stated above. Still further repetitions of the step of distilling and adding acetone may be made, but we find the number given above to be most efficient as a practical process.

In the second step of the process we take, at a time, 150 grams of the distillate. This is heated to between 180° and 200° C., for instance in a large flask in a suitable bath, and dry hydrogen chloride is passed over the surface of the liquid for about 8 hours. This time may be varied considerably, but we attain the most satisfactory results in the time stated. Methane is evolved. The final mixture is dissolved in hot water and the impurities extracted with benzene. The benzene is separated off, and the water layer treated with an excess of sodium hydroxide. The oils which separate are extracted with ether or benzene. The solvent is distilled off and the residue distilled under reduced pressure; for example at 168° to 180° at 10 mm. pressure. This yields the desired product 2:4-dimethyl-6-ethoxyquinoline which may be purified by recrystallization.

The reaction involved in the above step is believed to be as follows:

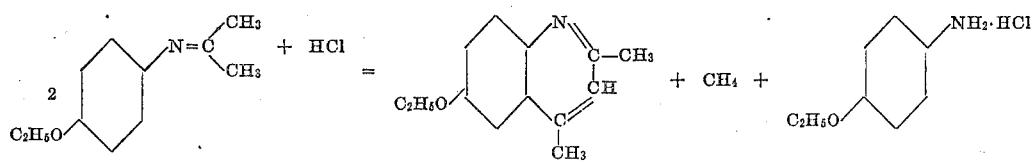

Having thus described our invention, what we claim as new and desire to secure by Letters Patent is:

The herein described process that comprises the steps of acting on p-phenetidine with acetone in the presence of iodine to produce p-ethoxyacetoneanil and the heating of this in the presence of hydrogen chloride to convert it into 2:4-dimethyl-6-ethoxyquinoline.

Signed at Rochester, New York, this 3rd day of July, 1923.

HANS T. CLARKE.
ERNEST R. TAYLOR.